July 23, 1957   J. FRASER   2,800,137
MIXING VALVES
Filed June 2, 1954   2 Sheets-Sheet 1
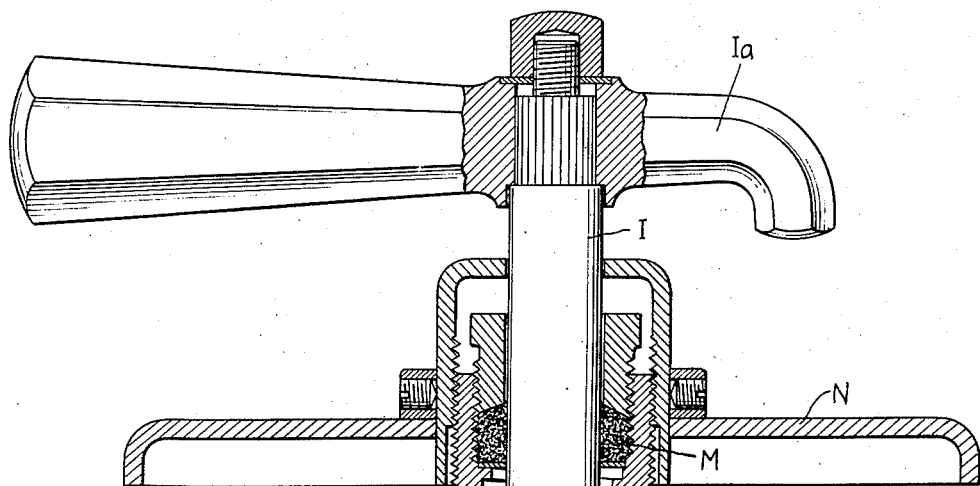
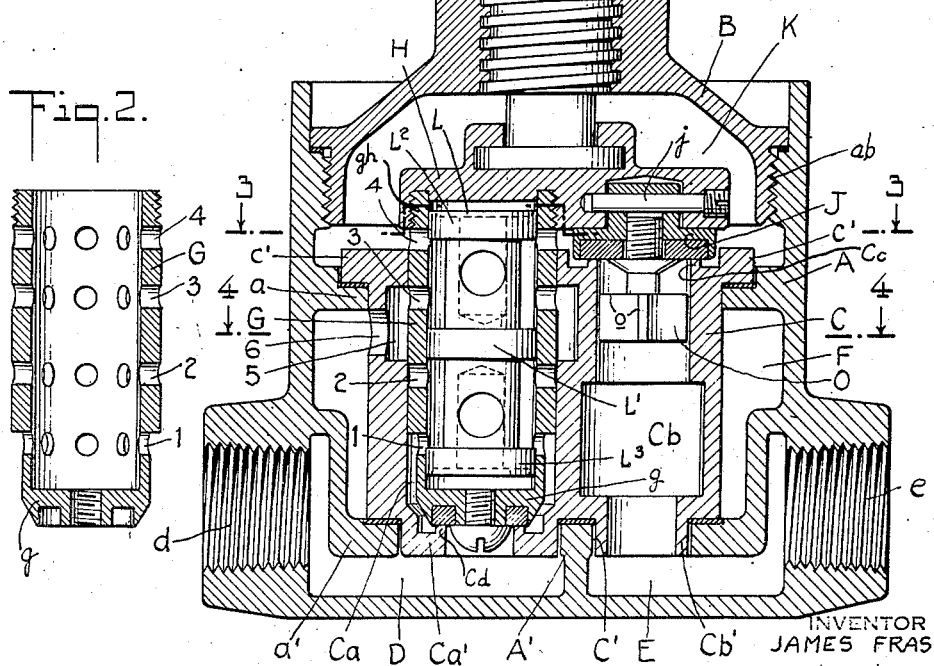
INVENTOR
JAMES FRASER
BY
John E. Hubbell
ATTORNEY July 23, 1957     J. FRASER     2,800,137
MIXING VALVES
Filed June 2, 1954     2 Sheets-Sheet 2
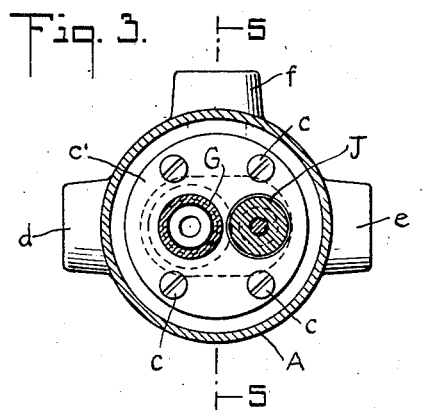
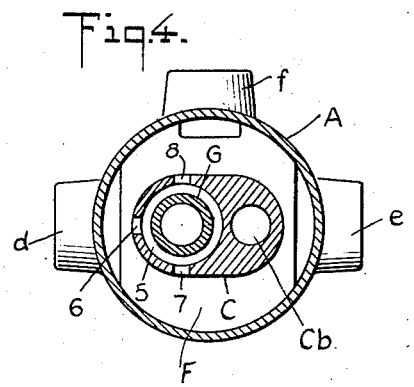
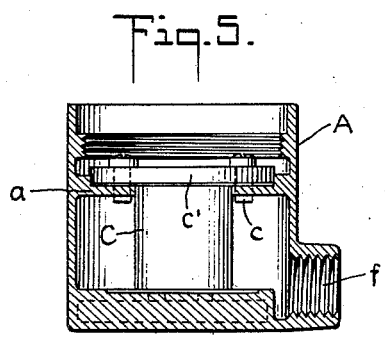
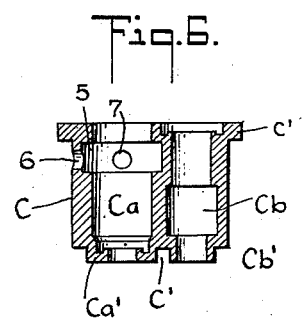
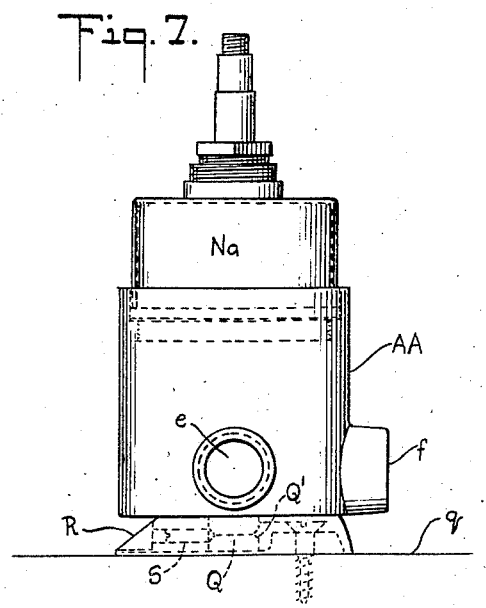
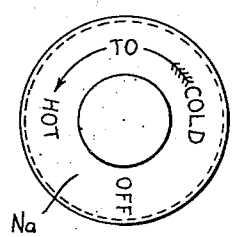
INVENTOR
JAMES FRASER
BY *John E. Hubbell*
ATTORNEY

UNITED STATES PATENT OFFICE 2,800,137
Patented July 23, 1957

2,800,137
MIXING VALVES

James Fraser, Wilmington, Del., assignor to Speakman Company, Wilmington, Del., a corporation of Delaware Application June 2, 1954, Serial No. 433,881

1 Claim. (Cl. 137—100)

The general object of the present invention is to provide an improved mixing valve of the general type disclosed in my Patent 2,443,499, granted June 15, 1948. The mixing valve disclosed and claimed in said patent is adapted for use in mixing two fluids, and particularly in mixing hot and cold water, in proportions dependent on the adjustment of the mixing valve. Said mixing valve includes pressure equalizing means comprising an element, ordinarily in the form of a plunger or piston valve, which operates in response to variations in the relative supply pressures of the two fluids to compensate for the tendency of such relative variations to vary the relative amounts of the two fluids included in the mixture formed by the valve when given a particular adjustment.

A mixing valve of the above mentioned type, finds its principal field of use in supplying shower heads with hot and cold water mixtures at temperatures normally dependent on valve adjustments made by the user. The inclusion in such a valve of pressure equalizing mechanism disclosed in said patent and responsive to variations in the hot and cold water supply pressures, greatly reduces the risk that the user will be scalded as a result of a sudden reduction in the pressure at which the cold water is supplied to the mixing valve. As is well known to those skilled in the art, in most shower bath installations, a substantial drop in the cold water supply pressure may result almost instantaneously from the opening of some more or less distant discharge valve in the same cold water supply system.

Extensive commercial use has been, and is being made of a mixing valve structure disclosed and claimed in my above entitled patent. A primary object of the present invention is to provide a mixing valve which has the general operating characteristics of the commercial valve now in general use as stated above, but is of smaller bulk, and cheaper to construct than said commercial valve.

The various features of novelty which characterize my invention are pointed out with particularity in the claim annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a section intersecting the axis of a desirable embodiment of my improved mixing valve in a form adapted for concealment in a wall;

Fig. 2 is an enlarged reproduction of a portion of the apparatus shown in Fig. 1;

Fig. 3 is a transverse section taken on the broken line 3—3 of Fig. 1;

Fig. 4 is a transverse section taken on the broken line 4—4 of Fig. 1;

Fig. 5 is a sectional elevation of a portion of the apparatus shown in Fig. 1 with the valve body shown in section on the line 5—5 of Fig. 3;

Fig. 6 is a sectional elevation of a block element shown in Fig. 1 in association with parts not shown in Fig. 5;

Fig. 7 is an elevation of a modification of the apparatus shown in Fig. 1 intended for use in an exposed position; and Fig. 8 is a plan view of a cover element for attachment to the apparatus shown in Fig. 7.

The embodiment of the invention illustrated in the drawings comprises a chambered valve body A having an opening at one end which is normally closed by a valve bonnet B. A chambered block C is mounted in the valve body A and attached to the latter by screws $c$ which extend through a peripheral flange portion $c'$ at one end of the block C and overlapping an annular flange portion $a$ of the valve body A. The chambered valve body A, bonnet B and block C cooperate to form a hot water chamber D with an inlet opening $d$, a cold water chamber E with an inlet opening $e$, and a mixture chamber F with an outlet $f$. In practice, it is not essential that the bonnet B should extend upward away from the portion of the valve body including the chambers D and E, and in practice, the axis of the valve body bonnet will be horizontal in many cases. For convenience of description, however, unless otherwise specified it will be assumed herein that the valve structure shown in Fig. 1 has its bonnet portion B extending upward above the main portion of the valve body and has its axis vertically disposed.

With the assumption just made, the inlet openings $d$ and $e$ are in horizontal alignment and the chambers D and E comprise relatively thin flat portions adjacent and parallel to the bottom of the valve body. The adjacent edges of the chambers D and E are separated by a horizontal partition portion of the valve body having an enlarged rib $A'$ at its upper edge. The rib $A'$ is received in a groove $C'$ in the lower end of the chambered block C and closes communication between the chambers D and E. The block C is formed with two, side-by-side vertical chambers $Ca$ and $Cb$ having annular lower end portions $Ca'$ and $Cb'$ extending into circular openings in a lower flange portion $a'$ of the chambered valve body, and closing communication between the chamber F and each of the chambers D and E.

A perforated tubular element G is within and axially movable in the chamber $Ca$. The upper end portion of the tubular element G is externally threaded and is screwed into a socket formed in a cross-head H normally attached to the lower end of a valve spindle I. As shown, the tubular wall of the member G is formed with four circular rows of radial ports 1, 2, 3 and 4 located at successively higher levels, and there are eight radial ports in each circular row. However, the number of ports is not critical and may be greater or less than eight. The valve spindle I is in threaded engagement with the bonnet B. In consequence, the member G may be moved up and down in the chamber $Ca$ by rotation of the spindle I. A poppet valve J alongside the upper end of the member G is suspended from the cross-head H by means including a pin $j$. The latter extends through an upper end portion of the valve J and through portions of the wall of a socket formed in the cross-head H which normally receives the upper end portion of the valve J. The valve spindle I has a handle $Ia$ attached to its upper end for use in rotating the spindle and thereby raising and lowering the cross-head H.

When the cross-head H is lowered it moves the poppet valve J into engagement with a valve seat $Cc$ at the upper end of the chamber $Cb$. The lowering of the cross-head H moves a plunger valve portion $g$ at the lower end of the member G into engagement with a valve seat $Cd$ at the lower end of the chamber $Ca$ and thereby prevents movement of hot water into the chamber Ca through the opening surrounded by the valve seat Cd. When the cross-head H is raised from its lowermost position, the valve g is moved to open communication between the hot water chamber D and the chamber Ca. At the same time, the valve J is raised and the upper end of the chamber Cb is put into open communication with a chamber K within the bonnet B. As is hereinafter explained, the up movement of the cross-head which makes it possible for cold water to pass into the chamber K from the chamber Cb, also raises the upper ports 4 in the wall of the chamber G. Cold water is then free to pass through those ports into the upper end portion of the chamber space within the member G unless those ports are then closed by a floating piston L within and axially movable in the space surrounded by the tubular member G.

The outer wall portion of the tube G below the level of the upper edges of the ports 1 is recessed to provide a flow path for water from the chamber D to and through the ports 1. The outer wall of the portion of the tube G above the ports 1 fits snugly against the inner wall of the chamber Ca except where the upper portion of that wall is formed with a circular channel 5. The outer wall of that channel is formed with three radial ports 6, 7 and 8. As shown, the axis of the port 6 intersects the axes of each of the chambers Ca and Cb, and the ports 7 and 8 are displaced 90° in opposite directions from the port 6 about the axis of the chamber Ca. The ports 6, 7 and 8 provide flow passages through which hot water may pass into the mixture space F from the ports 2 and cold water may pass into the space F from the ports 3.

The inlet ports 1 and 4 are subject to inverse throttling effects by the floating piston element L which is axially movable in the member G in accordance with changes in the relative pressures in the chambers D and K from which hot and cold water is respectively passed to the ports 1 and 4. As shown, the member L comprises three spaced apart cylindrical portions L', L² and L³ with upper and lower central stem portions of reduced diameter respectively connecting the central cylindrical portion L' to the end portions L² and L³. The stem portion $l$ connecting the cylindrical portions L' and L² is formed with a channel equalizing the fluid pressures at the opposite sides of the cylindrical portion L². Similarly, the stem portion $l'$ connecting the cylindrical portions L' and L³ is channeled to equalize the pressure in the space between the cylindrical portions L' and L³ with the pressure between the cylindrical portion L³ and the adjacent end wall of the space enclosed by the member G.

In normal operation the amounts of hot and cold water passed into the channel 5 depend upon two factors; namely, upon the axial adjustment of the member G relative to the chamber Ca, and on the hot and cold water supply pressures respectively supplied through the inlets d and e. When the cold water supply pressure is reduced without a corresponding reduction in the hot water supply pressure, the floating piston member L moves in the direction to throttle and reduce the rate of flow of water through the hot water inlet ports 1. At the same time, the effective flow area of the cold water supply ports 4 is increased by the upward movement of the member G. On an increase in the cold water supply pressure relative to the hot water supply pressure, the member L moves downward to increasingly throttle the cold water inlet ports 4, and to increase the free flow area through the hot water supply ports 1.

As shown, the spindle I is surrounded by packing provisions M provided to prevent leakage out of the chamber K through the space through which the spindle I passes. The escutcheon N, shown in Fig. 1, serves two well known purposes, one of which is a cover for the wall opening through which the valve spindle I extends when the body of the housing structure is of the concealed type. The escutcheon N also customarily serves as a dial to indicate the adjustment changes in angular position of the movable handle Ia, and the resultant changes in the axial position of the cross-head H and elements supported by the cross-head, and the resultant variation in the amounts of hot and cold water discharged through the mixture chamber F. The previously mentioned poppet valve J is loosely anchored in the cross-head H and is provided at its lower end with a guide member O. The latter is shown as formed with a plurality of radial guide ribs o which engage the inner portion of the surrounding wall of the passage Cb. The loose connection of the poppet valve J to the cross-head H and the relatively loose contact between the ribs o and the surrounding portion of the wall of the chamber Cb, make it possible to center the member G in the chamber Ca with the relatively high accuracy required, without requiring a similarly accurate positioning of the poppet valve J in the chamber Cb, to insure a suitably accurate engagement of the valve J with the valve seat Cc.

The general operation of the mixing valve mechanism shown in Figs. 1 to 6 is of the known type, in which only cold water is discharged during a small initial opening movement of the valve g, cold water then passing into the mixing chamber through the ports 3 and channel 5 and ports 6, 7 and 8. During this initial period the ports 2 are out of register with the channel 5. As the opening movement of the member G continues, the ports 2 have their upper portions brought into register with the channel 5, and the portions of the ports 3 in register with that channel diminish. As the up movement of the cross-head continues, the effective flow area of the ports 3 diminishes to zero while the effective flow area of the ports 2 increases to a maximum. Throughout the entire operating period the floating piston L tends to inversely vary the flow areas through the ports 1 and 2 as required to equalize the water pressures in the spaces within the chamber G at opposite sides of the piston portion L'. With such equalization, a dangerous risk of the scalding of the user of the shower head is avoided in a well known manner. The general operation characteristics of the valve mechanism shown in Figs. 1 to 6 and just referred to are not claimed as novel herein. However, the valve mechanism disclosed and claimed herein is simpler, more compact and less expensive to manufacture than the mechanism shown in Patent 2,443,499, and than any other mixing valve known to me and including automatic pressure equalizing apparatus and having operating characteristics common to the instant apparatus and to the apparatus shown in Patent 2,443,499. A major characteristic of my improved mixing valve is its provisions for keeping the portion of the mixing valve including the bonnet and spindle desirably cool at all times, without maintaining the cold water in the chamber K under pressure during the periods in which no water is being passed through the mixing valve. The normal average daily period of use of such a mixing valve is a fraction of one hour per 24 hour day. This means that in the average use of the shower head illustrated herein, even when the packing M surrounding the spindle I is in bad condition, it can be subjected to a pressure high enough to create leakage only during a few minutes of each day.

The mixing valve A includes simple and effective means of novel character for removing the floating piston element L from the tubular member G for inspection, cleaning or other purpose. To effect such removal, the bonnet B is first rotated relative to the valve body A, to temporarily eliminate or open the normally threaded connection ab between the parts A and B, and the tubular member G is then withdrawn from the passage Ca. Thereafter the member G is rotated relative to the cross-head H to temporarily eliminate or open the threaded connection gh between said member and the cross-head H, thus making the element L readily accessible for withdrawal from the hollow member G through the open end of the latter. Ordinarily the need for removal of the member L occurs only when the water passed into the hollow member G contains impurities which are deposited on the inner wall of the member G.

The mixing valve A shown in Fig. 1 is of the so-called "concealed" type, and in ordinary use all of the mixing valve at the lower side of the escutcheon N is within the side wall of the bathroom or other room in which the shower head is located. Under some conditions, it is desirable to have the mixing valve entirely exposed, and in Figs. 7 and 8 I have illustrated a mixing valve AA which may be operatively identical with the valve shown in Figs. 1 to 6, but is entirely exposed. The only structural differences between the valves shown in Figs. 1 and 7 are the replacement of the escutcheon N of Fig. 1 by a cup-shaped escutcheon member Na, and the addition to the valve housing structure AA of a supporting spud or projection Q, which extends away from the side of the valve AA which is to be anchored to a supporting wall.

The escutcheon member Na is shown in elevation in Fig. 7, and in plan in Fig. 8, as cup-shaped, and has its rim in engagement with the upper side of the bonnet B adjacent its periphery. The supporting spud Q in the form shown is a cylindrical extension from the side of the valve body AA which is adjacent the wall q to which the exposed mixing valve is to be attached. As shown, the spud Q is an integral extension of the cast metal body of the valve AA. The spud Q may well be, and is shown as, coaxial with the valve spindle I and is removably extended into a socket formed in a metallic supporting member R. The latter may be attached to the supporting wall q by wood screws or in any other suitable manner. The member R is formed with a threaded aperture for a screw S which has its inner end extending into an annular groove Q' surrounding the spud Q. When the screw S is backed off, the valve AA may be removed, or may be angularly adjusted, thus permitting the valve AA to be anchored in any desired angular position when the screw S is tightened.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claim and that in some cases certain features of my invention may be used without a corresponding use of other features.

Having now described my invention, what I claim as new and desire to secure by Letters Patent, is:

A mixing valve comprising a chambered housing structure with a removable closure element at one end and hot and cold water supply chambers at the opposite end of said structure, side-by-side hot and cold water passages transverse to said housing ends and each having an end adjacent the respective hot or cold water supply chamber, a cold water reservoir between said closure element and said cold water passage, a mixture chamber between said reservoir and hot and cold water supply chambers, a cross-head within said structure between said removable closure and said passages, a valve spindle extending through one end of said structure and connected to said cross-head and axially movable to move said cross-head relative to said structure end, an element mounted in said housing structure for movements transverse to said housing end and operative on said movements to move said cross-head toward and away from the hot and cold water passages and thereby regulate the outflow of water from said structure, a tubular member axially movable in said hot water passage and comprising a plunger valve connected to the end of said member adjacent said hot water supply chamber and controlling communication between the last mentioned passage and chamber and connected to and movable with said cross-head, a poppet valve in side by side arrangement with said plunger valve movably secured to said cross-head for movement to open and close the upper end of said cold water passage and thereby control communication between said cold water supply chamber and said reservoir, said tubular member being formed with a plurality of wall ports at different distances from said hot water supply chamber, a floating piston in said tubular member for controlling the passage of hot and cold water into said mixing chamber from said hot water supply chamber and said cold water reservoir and an element mounted in said housing structure and movable in said structure transversely to said housing ends connected to said cross-head to thereby move said cross-head toward and away from said hot and cold water passages and thereby regulate the outflow of water from said structure.

References Cited in the file of this patent

UNITED STATES PATENTS

| | | |
|---|---|---|
| 2,099,563 | Henning et al. | Nov. 16, 1937 |
| 2,417,158 | Fraser | Mar. 11, 1947 |
| 2,443,499 | Fraser | June 15, 1948 |
| 2,650,604 | Barnett | Sept. 9, 1953 |
| 2,682,276 | Fraser | June 29, 1954 |